US010525890B2

(12) United States Patent
Festerling, Jr. et al.

(10) Patent No.: US 10,525,890 B2
(45) Date of Patent: Jan. 7, 2020

(54) REAR VISION SYSTEM WITH EYE-TRACKING

(71) Applicant: Gentex Corporation, Zeeland, MI (US)

(72) Inventors: Dennis D. Festerling, Jr., Allegan, MI (US); Brock R. Rycenga, Wyoming, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/854,370

(22) Filed: Dec. 26, 2017

(65) Prior Publication Data

US 2018/0178729 A1 Jun. 28, 2018

Related U.S. Application Data

(60) Provisional application No. 62/439,181, filed on Dec. 27, 2016.

(51) Int. Cl.
*B60R 1/12* (2006.01)
*B60R 1/04* (2006.01)
*B60R 11/02* (2006.01)

(52) U.S. Cl.
CPC .............. *B60R 1/12* (2013.01); *B60R 1/04* (2013.01); *B60R 11/0235* (2013.01); *B60R 2001/1253* (2013.01); *B60R 2300/101* (2013.01); *B60R 2300/103* (2013.01)

(58) Field of Classification Search
None
See application file for complete search history.

(56) References Cited

U.S. PATENT DOCUMENTS

| 5,289,321 | A | 2/1994 | Secor |
| 8,411,245 | B2 | 4/2013 | Lee et al. |
| 2004/0027695 | A1 | 2/2004 | Lin |
| 2009/0316422 | A1* | 12/2009 | Lynam ................ B60Q 1/2665 362/494 |
| 2013/0229523 | A1 | 9/2013 | Higgins-Luthman et al. |
| 2014/0055616 | A1 | 2/2014 | Corcoran |
| 2016/0297362 | A1* | 10/2016 | Tijerina ................ H04N 7/181 |
| 2017/0349099 | A1* | 12/2017 | Kunze ...................... B60R 1/00 |

FOREIGN PATENT DOCUMENTS

| DE | 102012223479 A1 | 4/2014 |
| JP | 2005335410 A | 12/2005 |
| JP | 2009100180 A | 5/2009 |
| WO | 2008002989 A2 | 1/2008 |

* cited by examiner

*Primary Examiner* — Eileen M Adams
(74) *Attorney, Agent, or Firm* — Price Heneveld LLP; Bradley D. Johnson

(57) ABSTRACT

A rear vision system for a vehicle includes a camera mounted with the vehicle and capturing a field of view rearward of the vehicle, a rearview mirror including a display substrate thereon, and an image sensor directed toward an interior of the vehicle and configured to capture image data of an object. The system further includes a controller in communication with the camera and receiving a first video image of the first size corresponding with the field of view, with the image sensor to determine a position of the object within the image data, and with the display substrate to present a portion of the first video image thereon of a size less than the first size. The portion of the first video image is selected to correspond with an expected portion of the field of view based on the determined position of the object.

20 Claims, 6 Drawing Sheets

REAR VISION SYSTEM WITH EYE-TRACKING

CROSS-REFERENCE TO RELATED APPLICATION

This application claims priority under 35 U.S.C. § 119(e) to U.S. Provisional Application No. 62/439,181, filed Dec. 27, 2016, entitled "REAR VISION SYSTEM WITH EYE-TRACKING," the disclosure of which is hereby incorporated herein by reference in its entirety.

TECHNOLOGICAL FIELD

The present disclosure relates generally to a full display mirror system and more particularly, relates to a control scheme for selecting an image portion to display based on a detected location of the eyes of the driver.

SUMMARY

According to an aspect of the present disclosure, a rear vision system for a vehicle includes a camera mounted with the vehicle and capturing a field of view of a first area rearward of the vehicle, a rearview mirror including a display substrate thereon, and an image sensor directed toward an interior of the vehicle and configured to capture image data of an object. The system further includes a controller in communication with the camera and receiving a first video image of the first area corresponding with the field of view and in communication with the image sensor to determine a position of the object within the image data. The controller is further in communication with the display substrate to present a sub-area of the first area on the display substrate. The sub-area is selected to simulate a reflected image from the field of view to the object by the substrate based on the determined position of the object.

According to another aspect, a rear vision system for a vehicle includes a camera mounted with the vehicle and capturing a field of view of a first area rearward of the vehicle, a display substrate mounted within an interior of the vehicle, and an image sensor directed toward the interior of the vehicle and positioned to capture image data of an object. The system further includes a processor in communication with the camera and receiving a first video image of the field of view and in communication with the image sensor to locate the object within the image data and to determine a position of the object relative to a predetermined two-dimensional coordinate system along a theoretical viewing distance from the substrate. The controller is further in communication with the display substrate to present a sub-area of the first area on the display substrate. The sub-area is selected to correlate the position of the position of the object with a two-dimensional coordinate system assigned to the first area based on a scale between the theoretical viewing distance and a predetermined estimated image distance from the rearview mirror to a theoretical image plane to the rear of the vehicle.

According to another aspect, a vehicle includes a camera mounted with the vehicle and capturing a field of view of a first area rearward of the vehicle and a rearview mirror positioned within an interior of the vehicle. The rearview mirror includes a display substrate mounted within an interior of the vehicle and an image sensor directed toward the interior of the vehicle and positioned to capture image data of an object. The vehicle further includes a controller in communication with the camera and receiving a first video image of the field of view and in communication with the image sensor to locate the object within the image data and to determine a position of the object relative to a predetermined two-dimensional coordinate system along a theoretical viewing distance from the substrate. The controller is further in communication with the display substrate to present a sub-area of the first area on the display substrate. The sub-area is selected to correlate the position of the position of the object with a two-dimensional coordinate system assigned to the first area based on a scale between the theoretical viewing distance and a predetermined estimated image distance from the rearview mirror to a theoretical image plane to the rear of the vehicle.

These and other features, advantages, and objects of the present device will be further understood and appreciated by those skilled in the art upon studying the following specification, claims, and appended drawings.

DETAILED DESCRIPTION OF EMBODIMENTS

Figure 1:
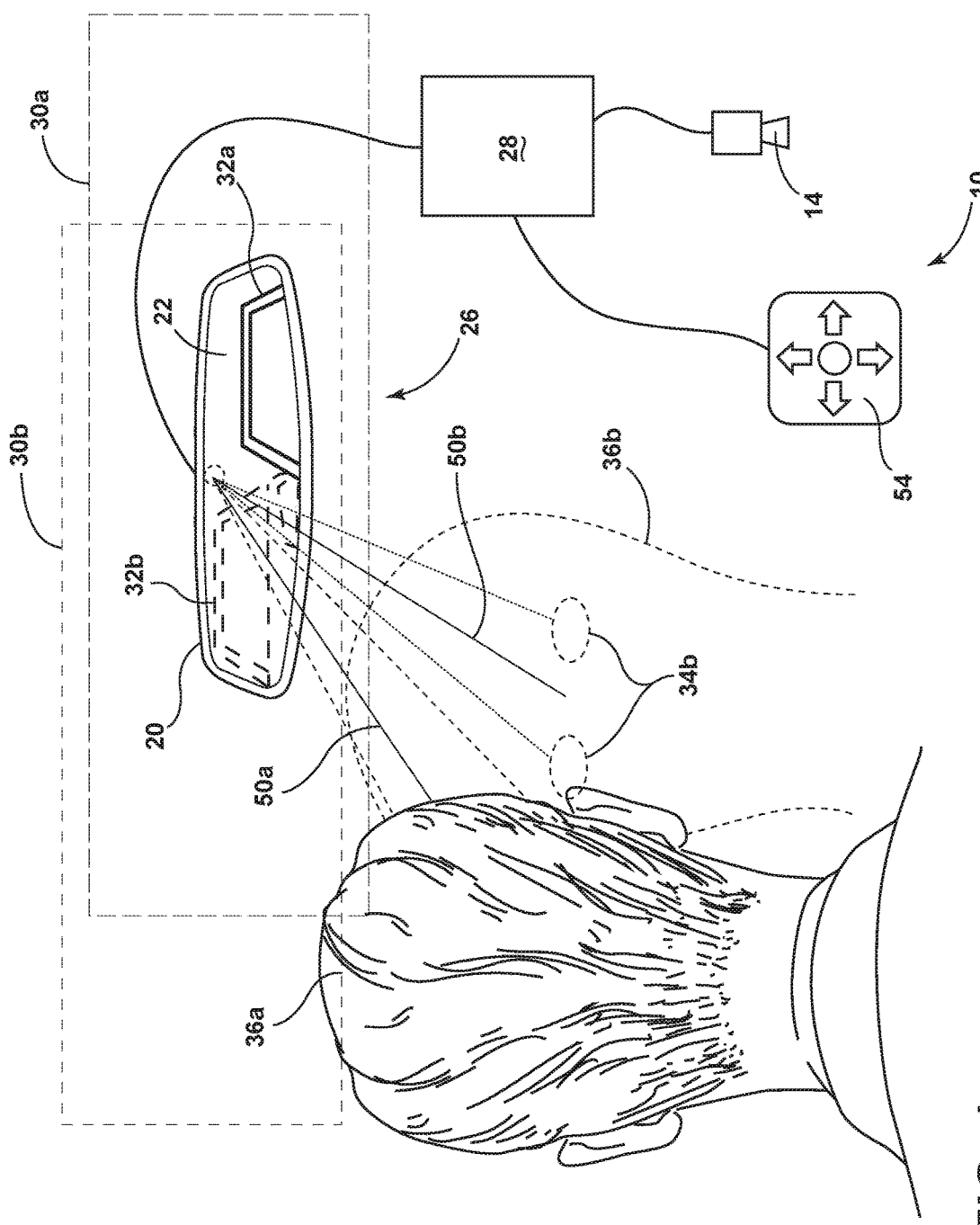
FIG. 1 is an illustrative view of a display mirror system assembly comprising an eye-tracking apparatus.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
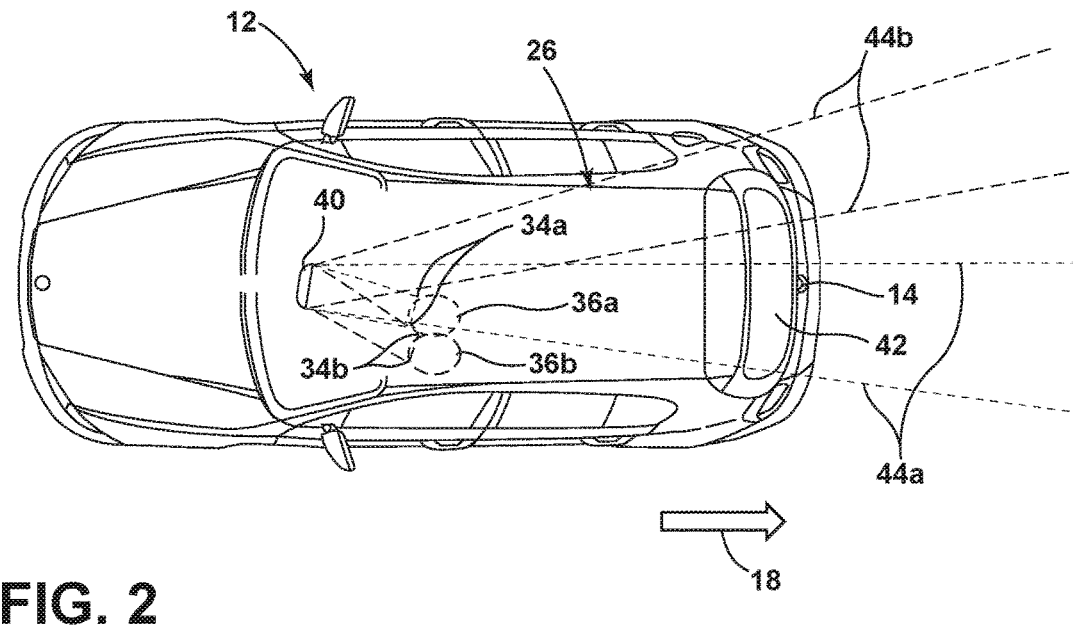
FIG. 2 is a schematic view of various mirror fields corresponding to various locations of the eyes of a driver of a vehicle.

Referring now to FIG. 1, reference numeral 10 indicates a rear vision system for a vehicle 12 (FIG. 2). System 10 includes a camera 14 capturing a field of view 16 (FIG. 4) rearward (e.g. in rear direction 18) of the vehicle 12 and a rearview mirror 20 including a display substrate 22 thereon. System 10 further includes an image sensor 24 (FIG. 6) directed toward an interior 26 of vehicle 12 and configured to capture image data of an object that, in an example, may include the eyes 34 or head 36 (both the eyes 34 and head 36 being generally indicated with respect to various identified positions thereof, designated as eyes 34a, 34b, etc. and head 36a, 36b, etc.) of a driver of vehicle 12. A control unit 28 is in communication with the camera 14 to receive a first image 30 (also being generally indicated with respect to various identified areas thereof, designated as image 30a, 30b, etc.) of the field of view 16. Control unit 28 is further coupled with the image sensor 24 to determine a position of the object (e.g., the eyes 34 or head 36 of the driver) within the image data and is also in communication with the display substrate 22 to present a portion 32 (also being generally indicated with respect to various identified portions, designated as portion 32a, 32b, etc.) of the video image 30 thereon of a sub-area that is smaller than the area of the field of view 16. The sub-area is selected to simulate a reflected image from the field of view 16 to the object by the display substrate 22 based on the determined position of the object.

It is noted that the control unit 28, as described herein, can be any suitable component or structure, including multiple, connected components or structures, within or associated with vehicle 12 that can receive the image 30 from camera 14 for presentation on display 22, detect the position of an object (e.g., the head 36 or eyes 34 of a driver), and present the portion 32 of the image 30 corresponding to the object position on display 22, according to the scheme disclosed herein. By way of example, control unit 28 may be or include specific functionality within a computer system on-board vehicle 12. Further, control unit 28 may comprise dedicated computer chips (e.g., application-specific integrated circuits) respectively connected with the sensor 24 and camera 14, and further in communication at least with each other.

Referring to FIG. 2, a schematic depiction is shown in which the head 36 of a driver of vehicle 12 is shown in various positions 36a and 36b with respect to a "standard" rearview mirror 40. As discussed herein, such a standard rearview mirror 40 can be considered as a reflective rearview mirror that the driver uses to view a reflected image out of a rear windshield 42 of vehicle 12 and to the rear of vehicle 12 in direction 18. As illustrated, the driver has a limited view toward the rear of vehicle 12 that corresponds to a mirror field 44 determined by incidence lines taken from the respective eyes 34 of the driver to the corresponding edges of the reflective surface of standard mirror 40 and corresponding reflection lines that, according to general optics principles, are at an equal angle to the incidence lines about a plane normal to the reflective surface. In this manner, the particular mirror field 44 and the accompanying portion of the area to the rear of vehicle 12 viewable through standard mirror 40 can be adjusted by changing the particular angle of the standard mirror 40 itself or by the driver moving his or her head 36 and, thereby, changing the angles of the incidence lines from the eyes 34 to the standard mirror 40.

In this type of arrangement, it is common for the driver to position the standard mirror 40 to correspond with the view that the driver would like to have available using standard mirror 40 when the driver's head 36 is in a comfortable, neutral seating position. During driving, the driver may wish to view an object or the like outside of this neutral mirror field 44 and may, accordingly, move his or her head 36, such as from a position 36a in FIG. 1 to a position 36b to instinctively provide a different view by an adjusted mirror field 44, such as from mirror field 44a to mirror field 44b, which is shown having moved both horizontally and vertically. In this manner, the viewable portion to the rear of vehicle 12 using standard mirror 40 can be changed without changing the baseline view that the driver has when in the above-described neutral position.

Figure 3:
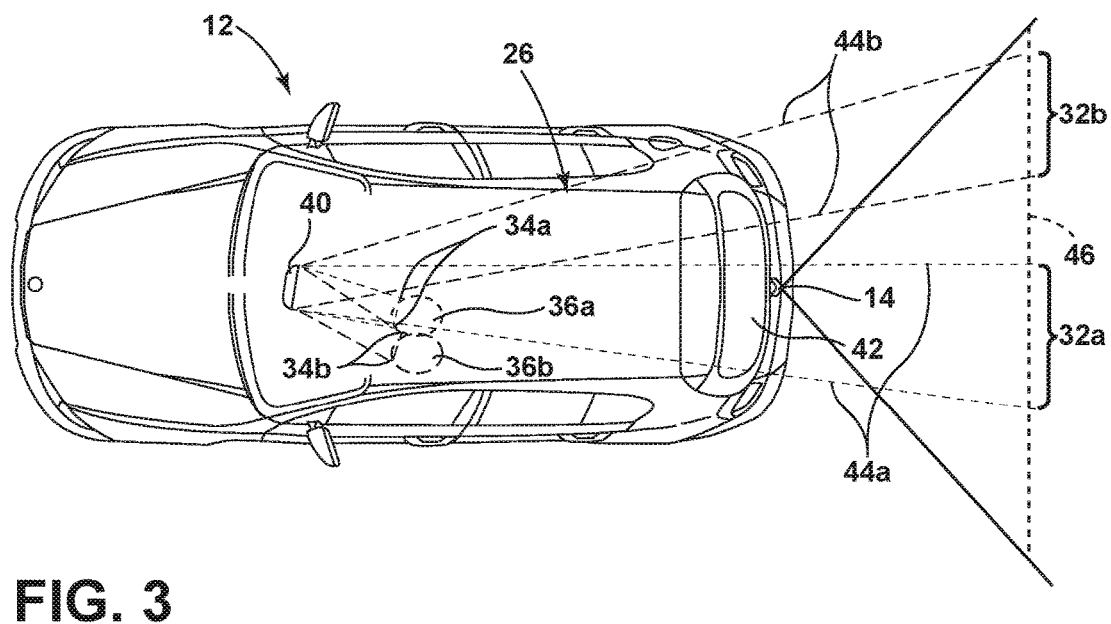
FIG. 3 is a schematic view correlating the mirror fields with an image plane projected in a field of view of a rear vehicle camera.

In the system 10 described above, wherein the standard rearview mirror 40 is replaced or otherwise accompanies the above-described "display" mirror 20, control unit 28 may, as discussed above, be configured to replicate the adjustment of the image presented on display 22 to correspond with the adjustment that the driver expects when moving his or her head 36 with respect to the illustrated standard mirror 40, while maintaining the image at a predetermined scale that matches what would be seen in a theoretical reflection based on general estimates of the driver position and of the view to the rear of vehicle 12. As shown in FIG. 3, vehicle 12 including system 10 can include camera 14 positioned on the rear of vehicle 12. In the illustrated example, camera 14 is positioned on the liftgate of the vehicle 12 beneath the rear windshield 42 included therein. In alternative arrangements, the camera 14 can be positioned within the interior of vehicle 12, such as along the headliner of the vehicle 12 with camera 14 adjacent to and directed out of rear windshield 42. Still further arrangements are possible and can be schematically similar to the depiction in FIG. 3. As illustrated, camera 14 can be configured such that the field of view 16 thereof is greater than that of the general size of mirror field 44 that would correspond to display 22 if it were a standard reflective surface. As illustrated, field of view 16 can be, for example, 90 degrees or greater, including angles of at least 120 degrees or the like. Accordingly, control unit 28 may crop the image 30 taken by camera 14, as illustrated in FIG. 1, such that the portion 32 of image 30 shown on display 22 generally mimics how a reflected image would appear. This includes both the size of the images projected and the viewing angle of the portion 32 of image 30.

As illustrated in FIG. 3, a theoretical image plane 46 is shown to represent the overall image 30 taken by camera 14 with the depicted field of view 16. As further shown, the driver of vehicle 12, when viewing the image portion 32 on display 22 may expect the image portion 32 to change when the driver's head 36 is moved, based on prior experience with standard mirrors 40. In this manner, system 10 can accommodate the driver's expectations by tracking the position of the driver's head 36 or, specifically, the eyes 34 of the driver with respect to mirror 20 and may pan the image 30 with respect to the portion 32 shown on display 22. This accommodation is schematically depicted in FIG. 3, wherein the portions 32a and 32b of the image plane 46 correspond to example head positions 36a,36b, determined by the location of the eyes 34a and 34b, with respect to display 22, such as by mapping the determined locations of eyes 34a and 34b to a two-dimensional coordinate system that correlates with a similar coordinate system that can be applied to image 30, or a general inference of the eye position made by detecting the position 36a,36b of the head 36, based on the same optical principles of the standard mirror 40 depicted in FIG. 2, which may be done using predetermined scale factors for image movement based on the distance between positions of eyes 34a and 34b.

Figure 4:
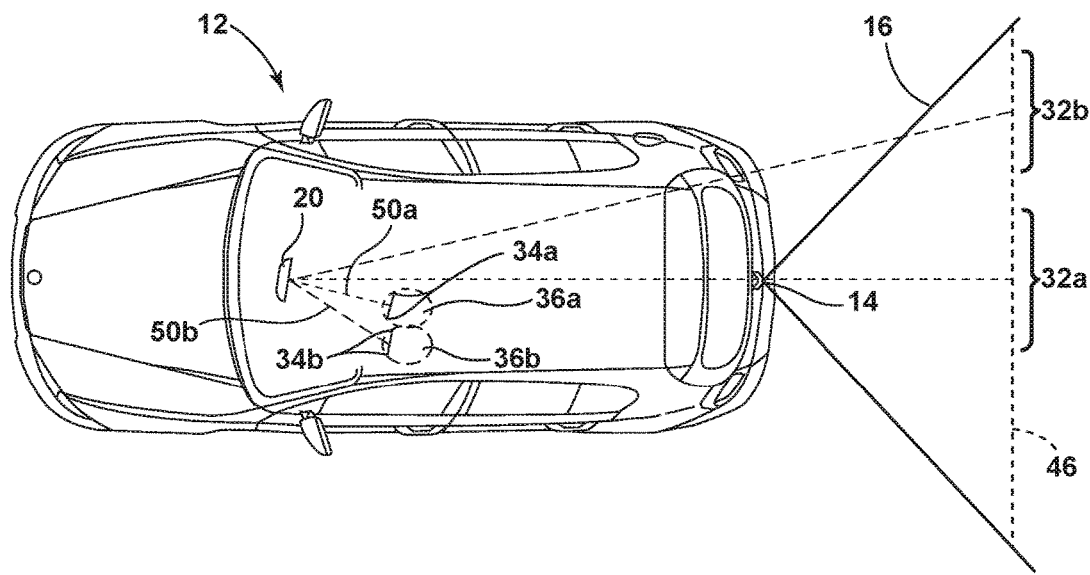
FIGS. 4 and 5 are schematic views of a correlation between portions of a camera field of view and detected eye locations of a driver of a vehicle.
Figure 5:
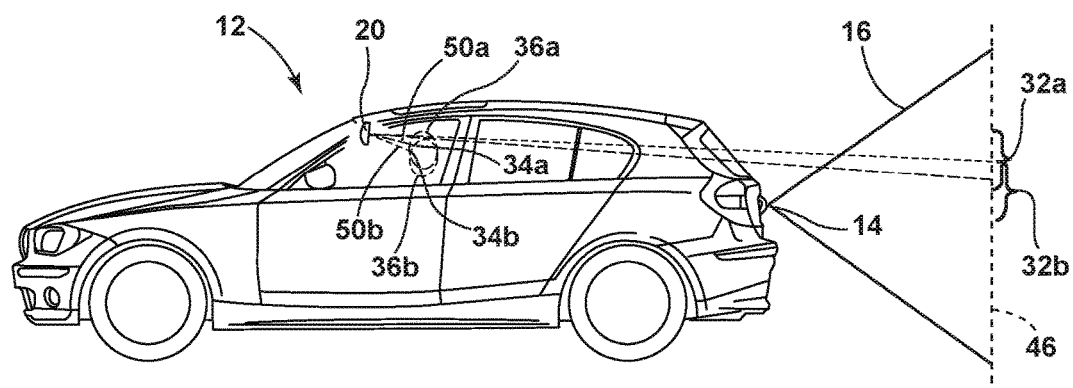

As shown in FIGS. 4 and 5, the movement of image 30 with respect to the portion 32 thereof shown on display 22 can be independent of the positioning of mirror 20. Instead, the portion 32 can be based on a baseline image that can be predetermined and stored in memory 70 (FIG. 8) at the time of manufacture, for example. In this manner, the position 34a,34b of the eyes 34 or 36a,36b of the head 36 at, for example, the time of activation of system 10 can be established and correlated with a baseline portion 32a of image 30 that corresponds to, for example, a directly rearward 18 view within the field of view 16. In the example shown in FIG. 1, for example, an input 54 can be provided to allow the driver to adjust the baseline image according to needs or desires. In a further example, such a baseline image can correspond with a particular estimated field of view 16 of an average driver at a neutral (i.e. aligning with the longitudinal axis of vehicle 12) position of mirror 20. In such an embodiment, system 10 can track the movement of mirror 20, itself, communicating such movement (or the absolute position thereof) to control unit 28 that can adjust the displayed portion 32 of image 30 based on such movement, in a way determined to mimic the movement of a reflective mirror. Such tracking can be done by positioning a marker within the interior 26 of vehicle 12 that can be located using sensor 24 (when included in mirror 20) or using a magnetic or mechanical sensor embedded in the mounting structure of mirror 20 that facilitates movement thereof. In an embodiment when a marker is positioned in interior 26 of vehicle 12, the control unit 28 may be able to use head 36 or eye 34 tracking in combination with the tracking of the marker relative to the image sensor 24 to determine the desired image portion 32 directly.

System 10 can continue to track the location of the head 36 or eyes 34 and can pan the image 30 with respect to the displayed portion 32 according to movement thereof to correspond with an expected movement based on optical principles, as discussed above. As shown, such movement can be both horizontal and vertical and can be generally opposite the movement of the eyes 34. The movement can be calibrated in advance and/or can be adjustable by the driver. In certain modes of use, the vertical tracking shown in FIG. 5 may present advantages over static displays due, at least in part, to the short aspect-ratio of the portion 32 of image 30 presented on display 22 (due to the display 22 typically being wider than it is tall). For example, the tracking functionality disclosed herein may allow the driver to move or tilt his or her head 36 upward, such as by raising his or her seat within vehicle 12. In such an example, the portion 32 of image 30 would pan downwardly to allow the driver, for example, to view an area immediately behind the vehicle 12 (such as adjacent the rear bumper). It is noted, that such a position may not be visible using a standard reflective rearview mirror 40, as the view would be blocked by the trunk area or rear deck, depending on the vehicle type. To further achieve such a point-of-view, a second camera can be included, for example, within the rear bumper or adjacent the license plate of vehicle 12. Such a camera may be particularly useful when camera 14 is adjacent the headliner of vehicle 12 to remove distortion. In such a multi-camera arrangement, control unit 28 can employ an image stitching function, algorithm, or the like to provide smooth transitioning between the respective camera images to still effectively present a single image 30 for panning in the above-described manner. In either example, when the head 36 or eyes 34 of the driver move back toward the original position, control unit 28 will pan the portion 32 of image 30 back toward the portion that corresponds with the neutral viewing position.

In the embodiment depicted in FIG. 1, the sensor 24 can be included in mirror 20. In such an arrangement, the position of the eyes 34 may vary depending on the orientation of mirror 20. In various embodiments, the mirror 20 may have a reflective, partially transparent surface overlying display 22 so that mirror 20 can be used as a standard mirror 40 when, for example, display 22 is inactive. In this manner, the user may adjust mirror 20 to provide the desired baseline view prior to activation of display 22, meaning that the predetermined baseline image, as well as the position of eyes 34 detected by sensor 24 may closely correspond with the preselected portion 32 of image 30 presented on display 22 or a previously-adjusted variation thereof. In a further example, activation of display 22 can correspond with upward tilting of display 22 to reduce competition of the actual reflected image. Control unit 28 may compensate for such adjustment in the selection of the portion 32 of image 30 presented on display 22.

In a variation, sensor 24 may be located elsewhere in vehicle 12, such as in an overhead console adjacent mirror 20 or the like. In such an embodiment, the portion 32 of image 30 selected based on the detected position of eyes 34 may be independent of the mirror position. Accordingly, system 10 may also be configured to determine the position of mirror 20, particularly of display 22 thereof, to correlate the portion 32 of image 30 to the detected position of display 22. In an example, this tracking can be done using various mechanical or magnetic sensors, as discussed above. In this manner, as discussed above, the diver may be able to physically move mirror 20 to change the baseline portion 32 of image 30 presented on display 22, thereby removing a need for an input 54. Additional variations are also possible, wherein mirror 20 may include a sensor 24 therein and may also incorporate monitoring of the position of display 22 to provide similar adjustment and responsiveness.

The tracking functionality may utilize an infrared illumination of the area viewable by sensor 24. In one example, the control unit 28 may be able to identify a "blob" that, based on various criteria, can be reasonably identified as the head 36 of the driver (i.e. based on general size and location criteria). As discussed above, the location of the eyes 34 can be inferred based on the head 36 location determined based on the blob detection. Again, the eye 34 position can be based on average eye 34 location relative to the identified head 36 and may scale for the size of the detected blob. Alternatively, the irises of the driver's eyes 34 may be specifically identified based on a specific reflection pattern and/or location principles similar to the blob detection noted above for head 36 identification. Such illumination may be optimized in conditions allowing for a high optical transmittance in the near infrared (NIR) range. In some embodiments, the disclosure may provide for a panel comprising display 22 that may have a high light transmittance in the NIR range, for example wavelengths ranging from 810 nm to 850 nm in the optical spectrum, along at least a portion thereof. Additionally, in some implementations, the mirror 20 assembly may comprise a plurality of light sources 58 configured to illuminate at least one iris of the operator of the vehicle.

Figure 6:
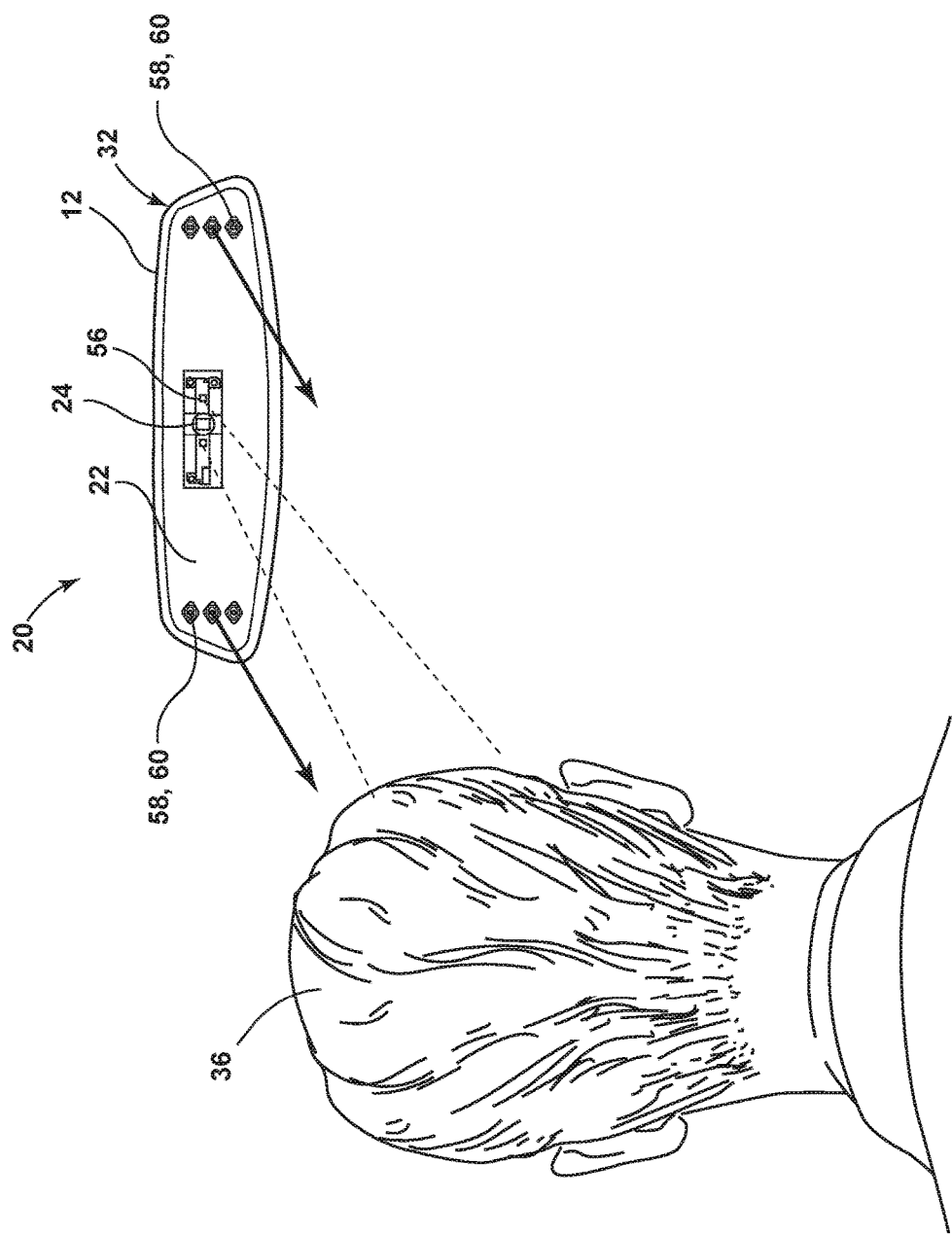
FIG. 6 is an illustrative view of a mirror assembly comprising an eye-tracking apparatus.
Figure 7:
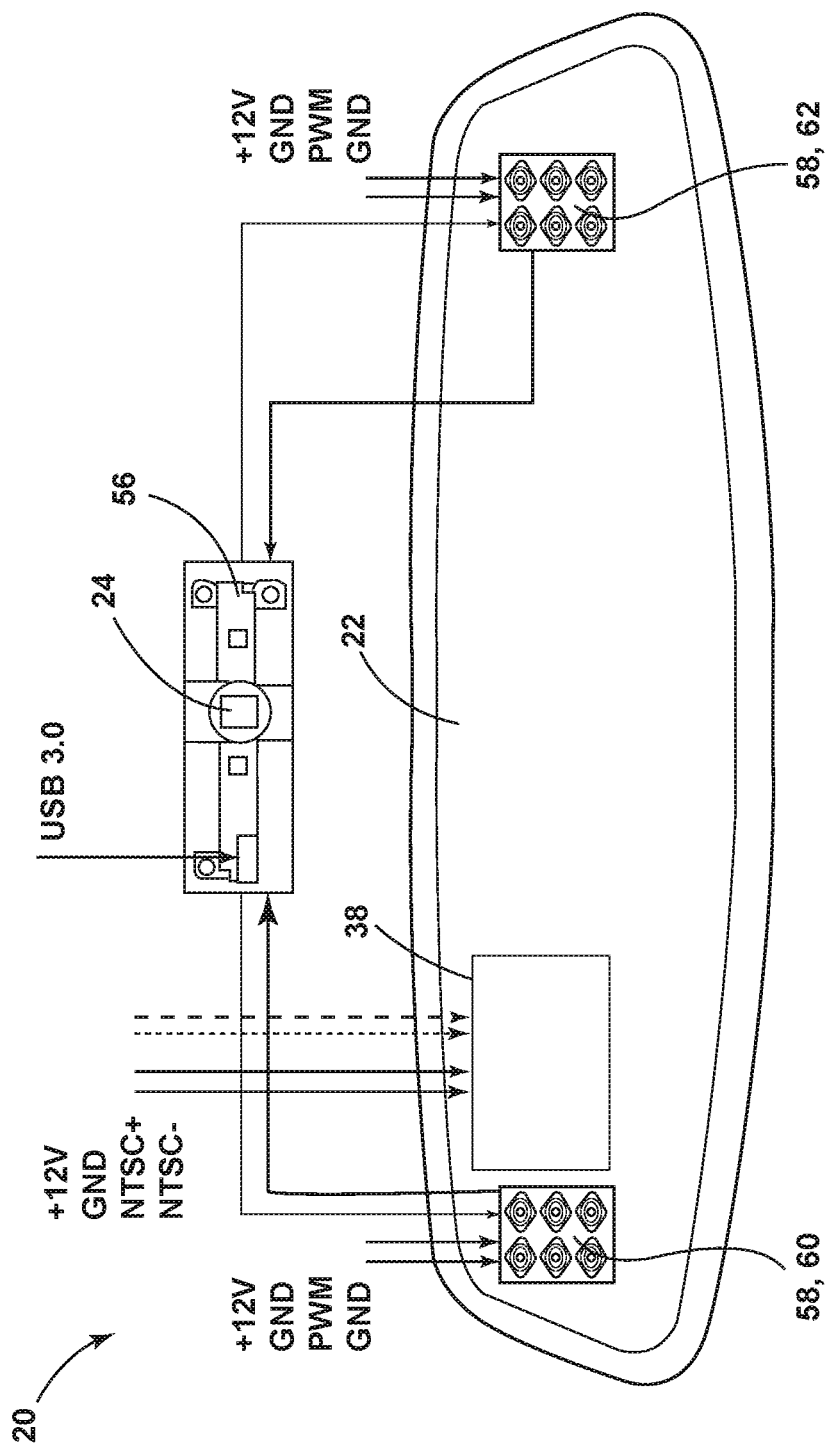
FIG. 7 is a schematic view of the mirror assembly of FIG. 6.

As shown in FIG. 6, to provide for the tracking function, sensor 24 may be disposed proximate a rear (interior) surface of the display 22. The image sensor 24 may correspond to, for example, a digital charge-coupled device (CCD) or complementary metal-oxide-semiconductor (CMOS) active pixel sensor, although it is not meant to be limited to these example devices. In the illustrated example, the sensor 24 may be in communication with at least one light source 58, which may correspond to one or more infrared emitters configured to output an emission of light in the NIR range. In this configuration, control unit 28 or the sensor 24 may be configured to selectively activate the one or more infrared emitters corresponding to the at least one light source 58 to provide illumination such that an instantaneous location of the head 36 or eyes 34 may be determined and/or monitored. Alternatively, sensor 24 may be a "passive" sensor in that it does not require illumination. In one example, sensor 24 can be a heat sensor that can be used to track the head 36 of the driver. In such an embodiment, the light source 58, discussed above, may not be included in system 10.

When present, the infrared emitters or the light sources 58 may correspond to a plurality of infrared emitter banks 60. Each of the infrared emitter banks 60,62 may comprise a plurality of light emitting diodes, which may be grouped in a matrix or otherwise grouped and disposed behind the rear surface of the display 22. In an embodiment, the plurality of light sources 58 may correspond to a first emitter bank 60 and a second emitter bank 62. The first emitter bank 60 may be configured to output the emission in the NIR range from a first side portion of the front (outside) surface of the display 22. The second emitter bank 62 may be configured to output the emission in the NIR range from a second side portion of the front surface of the display 22. In this configuration, the system 10 may be configured to illuminate the eyes 34 of the driver such that the sensor 24 may discern the eyes 34 of the driver from within the image data received from sensor 24.

In an embodiment, each of the first emitter bank 60 and/or the second emitter bank 62 may correspond to more or fewer LEDs or banks of LEDs. In some embodiments comprising a variation of display 22 having a high level of transmittance in the NIR range at least in portion(s) overlying emitter banks 60,62, system 10 may utilize fewer or less intense LEDs. In some embodiments comprising a variation of display 22 having a lower level of transmittance in the NIR range, the system 10 may utilize a greater number of or more intense LEDs.

Sensor 24 may be disposed on a circuit 56, for example a printed circuit board in communication with control unit 28. Control unit 28 may further be in communication with various devices that may be incorporated in the vehicle 12 via the communication bus 66 or any other suitable communication interface. Control unit 28 may correspond to one or more processors or circuits, which may be configured to process image data received from sensor 24. In this configuration, the image data may be communicated from sensor 24 to control unit 28. The control unit 28 may process the image data with one or more algorithms configured to discern or otherwise identify the eyes 34 of the driver within the image data. Further detailed discussion of the control unit 28 and the various devices that may be in communication therewith are discussed in reference to FIG. 8.

The control unit 28 may further be in communication with display 22. The control unit 28 may be operable to display the image data received from camera 14, as discussed above, such that the driver may view the portion 32 of the image 30 received from camera 14. As further discussed above, display 22 may correspond to a partial or full display mirror configured to display the portion 32 of the video image 30 through at least a portion of the mirror assembly 20. The display 22 may be constructed utilizing various technologies, for example LCD, LED, OLED, plasma, DLP or other display technology. Examples of display assemblies that may be utilized with the disclosure may include U.S. Pat. No. 6,572,233 "REARVIEW DISPLAY MIRROR," U.S. Pat. No. 8,237,909 "VEHICULAR REARVIEW MIRROR ASSEMBLY INCLUDING INTEGRATED BACKLIGHTING FOR A LIQUID CRYSTAL DISPLAY (LCD)," U.S. Pat. No. 8,411,245 "MULTI-DISPLAY MIRROR SYSTEM AND METHOD FOR EXPANDED VIEW AROUND A VEHICLE," and U.S. Pat. No. 8,339,526 "VEHICLE REARVIEW MIRROR ASSEMBLY INCLUDING A HIGH INTENSITY DISPLAY," which are incorporated herein by reference in their entirety.

Figure 8:
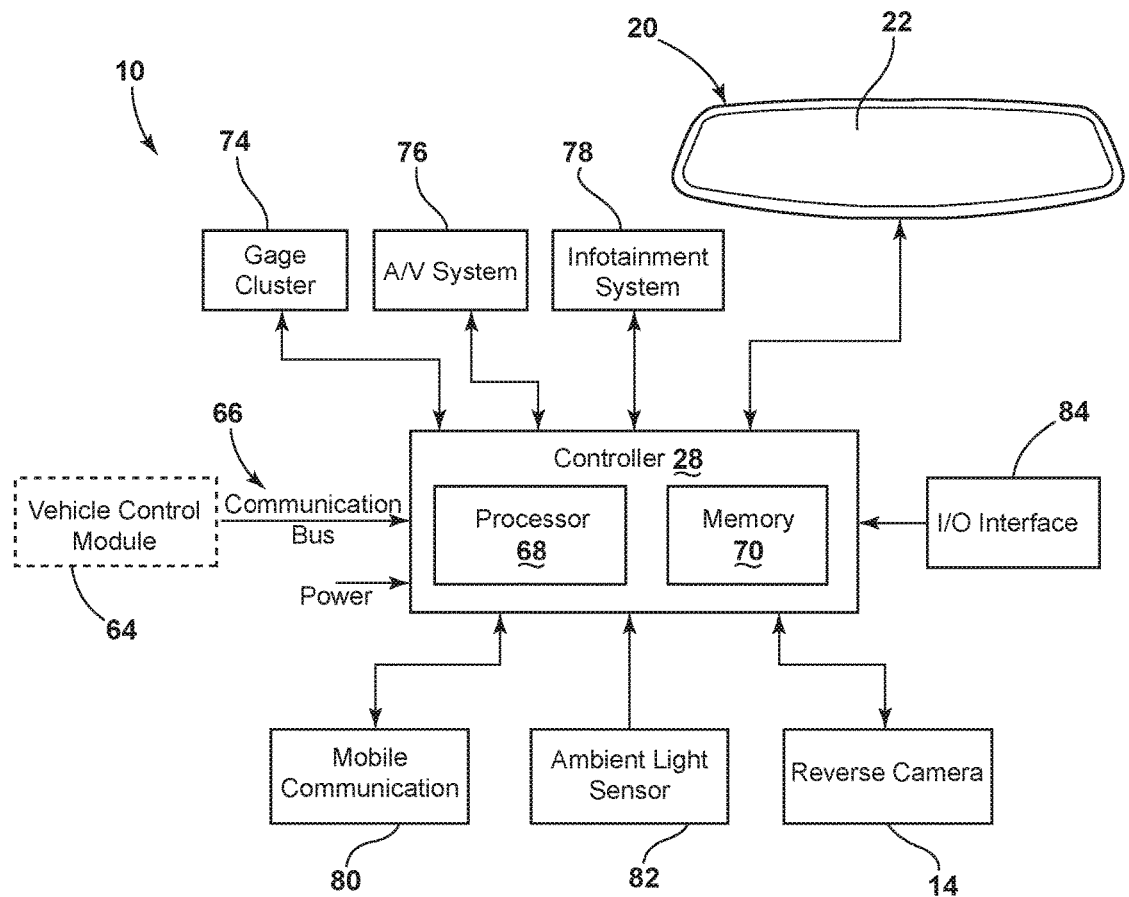
FIG. 8 is block diagram of a rear vision system incorporating an eye-tracking apparatus disposed in a mirror assembly in accordance with the disclosure.

Referring to FIG. 8, a block diagram of system 10 with additional components of overall control system of vehicle 12 is shown. The control unit 28 is shown in communication with mirror 20, including sensor 24 (FIG. 6), and the camera 14 and may also be in communication with the vehicle control module 64 via a communication bus 66 of the vehicle 12. The communication bus 66 may be configured to deliver signals to the control unit 28 identifying various vehicle states. For example, the communication bus 66 may be configured to communicate to the control unit 28 a drive selection of the vehicle, an ignition state, a door open or ajar status, or the like. Such information and control signals may be utilized by the control unit 28 to activate or adjust various states and/or control schemes of the system 10 and/or the mirror assembly 20.

The control unit 28 may comprise a processor 68 having one or more circuits configured to receive the signals from the communication bus 66 and control the system 10. The processor 68 may be in communication with a memory 70 configured to store instructions to control operations of the system 10. For example, the control unit 28 may be configured to store one or more characteristics or profiles utilized by the control unit 28 to identify the eyes 34 of the driver of the vehicle 12 within the image data.

The control unit 28 may further be in communication with camera 14. The control unit 28 may receive image data from camera 14, as discussed further above. In this manner, based on the identification of the eyes 34, the control unit 28 may be configured to select a corresponding portion 32 of the video image 30 to present on display 22 and to smoothly pan the image 30 with respect to the portion 32, if necessary. The control unit 28 may further be in communication with one or more of a gauge cluster 74, an audio/video (A/V) system 76, an infotainment system 78, a media center, a vehicle computing system, and/or various other devices or systems of the vehicle. In various embodiments, the control unit 28 may also display the video image 30 from camera 14 on the devices 74-78, including an un-cropped image 30.

In a further embodiment, the control unit 28 may correspond to one of more processors or circuits and may be configured to further process the image data received from sensor 24. In this configuration, the control unit 28 may process the image data with one or more algorithms configured to determine an identity of the operator of the vehicle. With the identity of the operator or one or more passengers of the vehicle identified, the control unit 28 may further be operable to control various systems or functions of the vehicle, as discussed further in co-pending, commonly-assigned U.S. patent application Ser. No. 15/372,875, the entire disclosure of which is incorporated by reference herein.

The control unit 28 may further be in communication with an ambient light sensor 82. The ambient light sensor 82 may be operable to communicate a light condition, for example a level brightness or intensity of the ambient light proximate the vehicle. In response to the level of the ambient light, the control unit 28 may be configured to adjust a light intensity output from the display 22. In this configuration, the operator of the control unit 28 may adjust the brightness of the display 22.

The control unit 28 may further be in communication with an interface 84 configured to receive one or more inputs configured to control aspects of system 10. In some embodiments, the interface 84 may be combined with one or more devices of the vehicle. For example, the interface 84 may form a portion of the gauge cluster 74, the A/V system 76, the infotainment system 78, a display console and/or various input/output devices that may commonly be utilized in automotive vehicles (e.g. a steering switch, steering wheel controls, etc.). In this way, the disclosure provides for various control schemes for using system 10 in vehicle 12. In one example, the input 54 depicted in FIG. 1 can be presented graphically on one of these devices.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rear vision system for a vehicle, comprising:
   a camera mounted with the vehicle and capturing a field of view of a first area rearward of the vehicle;
   a rearview mirror including a display substrate thereon;
   an image sensor directed toward an interior of the vehicle and configured to capture image data of an object; and
   a controller:
      in communication with the camera and receiving a first video image of the first area corresponding with the field of view;
      in communication with the image sensor to determine a position of the object within the image data; and
      in communication with the display substrate to present a sub-area of the first image on the display substrate, the sub-area being smaller than the first area and selected to simulate a reflected image from the field of view to the object by the substrate based on the determined position of the object, remaining portions of the first area outside of the sub-area not being presented on the display.

2. The rear vision system of claim 1, wherein the object is a pair of eyes of a driver of the vehicle.

3. The rear vision system of claim 1, wherein the sub-area of the first video image is selected to correspond with an estimated sub-area of the field of view based on the determined position of the object by panning the first image with respect to the sub-area based on a movement of the object from a baseline position.

4. The rear vision system of claim 3, wherein the object is panned based on a predetermined scale to correlate with a scale between an estimated distance from the rearview mirror to the object and an estimated distance from the rearview mirror to a theoretical image plane to the rear of the vehicle.

5. The rear vision system of claim 4, wherein the estimated distance from the rearview mirror to the object is fixed.

6. The rear vision system of claim 4, wherein a baseline position of the first image with respect to the portion can be adjusted by a user.

7. The rear vision system of claim 1, wherein the image sensor is included within the rearview mirror.

8. The rear vision system of claim 1, further including a light source directed toward an interior of the vehicle and configured for illuminating a portion of the object.

9. The rear vision system of claim 8, wherein the light source is configured to emit light in a near infrared (NIR) range.

10. The rear vision system of claim 1, wherein the sub-area is scaled to generally match a scale of a theoretical reflected image of the field of view by the substrate to the object.

11. A rear vision system for a vehicle, comprising:
    a camera mounted with the vehicle and capturing a field of view of a first area rearward of the vehicle;
    a display substrate mounted within an interior of the vehicle;
    an image sensor directed toward the interior of the vehicle and positioned to capture image data of an object; and
    a processor:
       in communication with the camera and receiving a first video image of the field of view;
       in communication with the image sensor to locate the object within the image data and to determine a position of the object relative to a predetermined two-dimensional coordinate system along a theoretical viewing distance from the substrate; and
       in communication with the display substrate to present a sub-area of the first image on the display substrate, the sub-area being smaller than the first area and selected to correlate the position of the object with a two-dimensional coordinate system assigned to the first area based on a scale between the theoretical viewing distance and a predetermined estimated image distance from the display substrate to a theoretical image plane to the rear of the vehicle, remaining portions of the first area outside of the sub-area not being presented on the display.

12. The rear vision system of claim 11, wherein:
    the object is a pair of eyes of a driver of the vehicle; and
    the sub-area is selected to simulate a reflected image from the field of view to the eyes of the driver by the substrate.

13. The rear vision system of claim 11, wherein the sub-area of the first video image is selected by panning the first image with respect to the sub-area based on a movement of the position of the object from a baseline position within the first two-dimensional coordinate system as a factor of the scale.

14. The rear vision system of claim 13, wherein the predetermined viewing distance is fixed.

15. The rear vision system of claim 13, wherein the baseline position is adjustable by a user.

16. The rear vision system of claim 11, wherein the display substrate and the image sensor are included within a rearview mirror positioned within the interior of the vehicle.

17. The rear vision system of claim 11, further including a light source directed toward an interior of the vehicle and configured for illuminating a portion of the object.

18. The rear vision system of claim 17, wherein the light source is configured to emit light in a near infrared (NIR) range.

19. The rear vision system of claim 11, wherein the sub-area is scaled to generally match a scale of a theoretical reflected image of the field of view by the substrate to the object.

20. A vehicle, comprising:
- a camera mounted with the vehicle and capturing a field of view of a first area rearward of the vehicle;
- a rearview mirror positioned within an interior of the vehicle and including:
  - a display substrate mounted within an interior of the vehicle; and
  - an image sensor directed toward the interior of the vehicle and positioned to capture image data of an object; and
- a controller:
  - in communication with the camera and receiving a first video image of the field of view;
  - in communication with the image sensor to locate the object within the image data and to determine a position of the object relative to a predetermined two-dimensional coordinate system along a theoretical viewing distance from the substrate; and
  - in communication with the display substrate to present a sub-area of the first image on the display substrate, the sub-area being smaller than the first area and selected to correlate the position of the position of the object with a two-dimensional coordinate system assigned to the first area based on a scale between the theoretical viewing distance and a predetermined estimated image distance from the rearview mirror to a theoretical image plane to the rear of the vehicle, remaining portions of the first area outside of the sub-area not being presented on the display.

* * * * *